(No Model.) 5 Sheets—Sheet 2.
G. TYLER.
GRAIN BINDER.
No. 315,091. Patented Apr. 7, 1885.
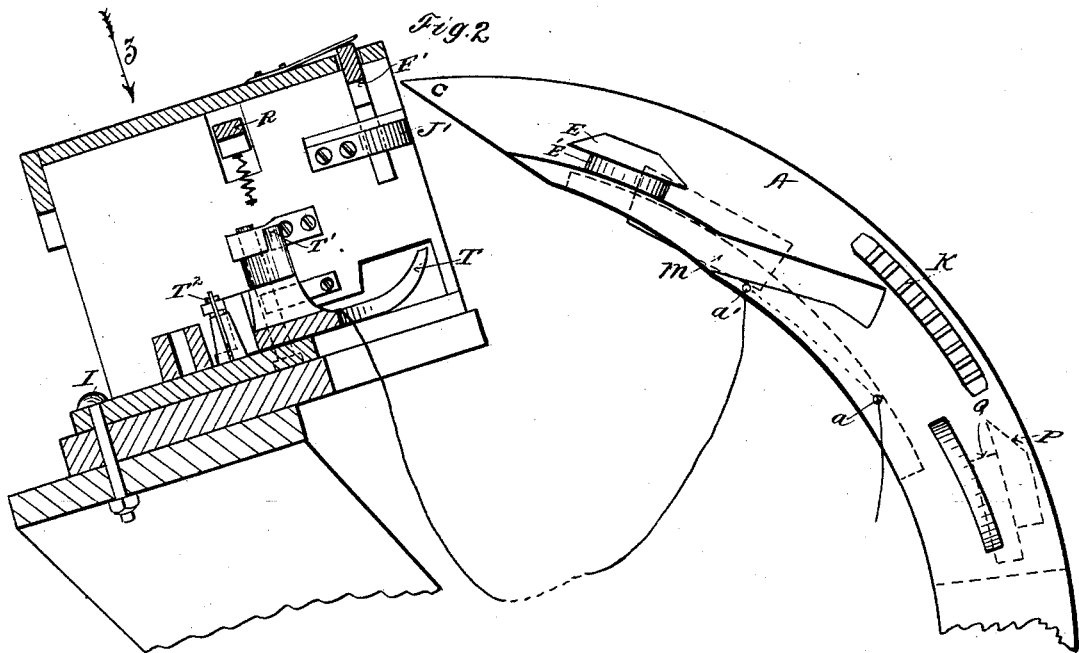
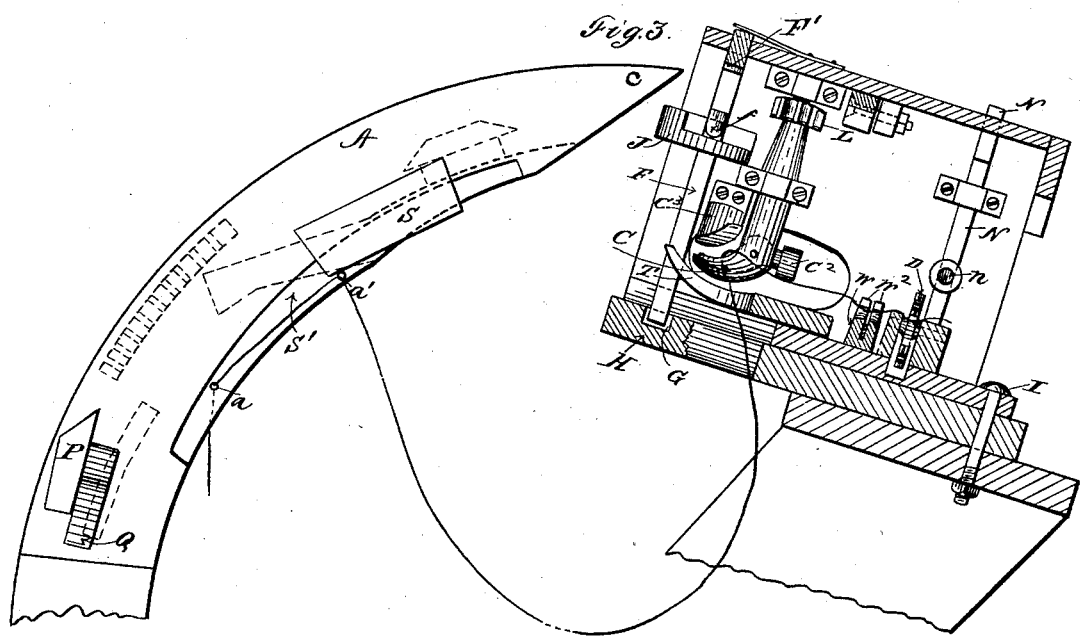
Witnesses.
W. R. Edelen,
E. P. Nichols
Inventor.
George Tyler
Per _____ Sturgess
Atty.

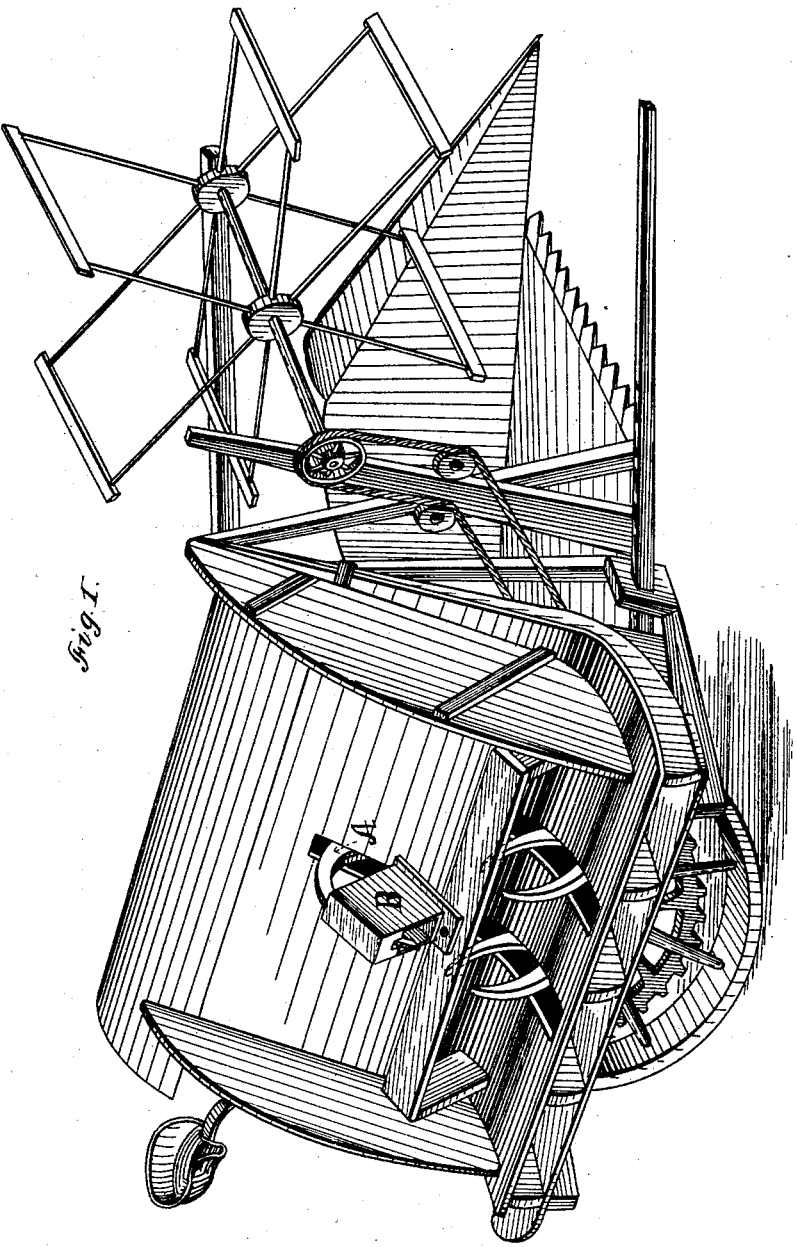

(No Model.)  G. TYLER.  5 Sheets—Sheet 3.
GRAIN BINDER.
No. 315,091.  Patented Apr. 7, 1885.
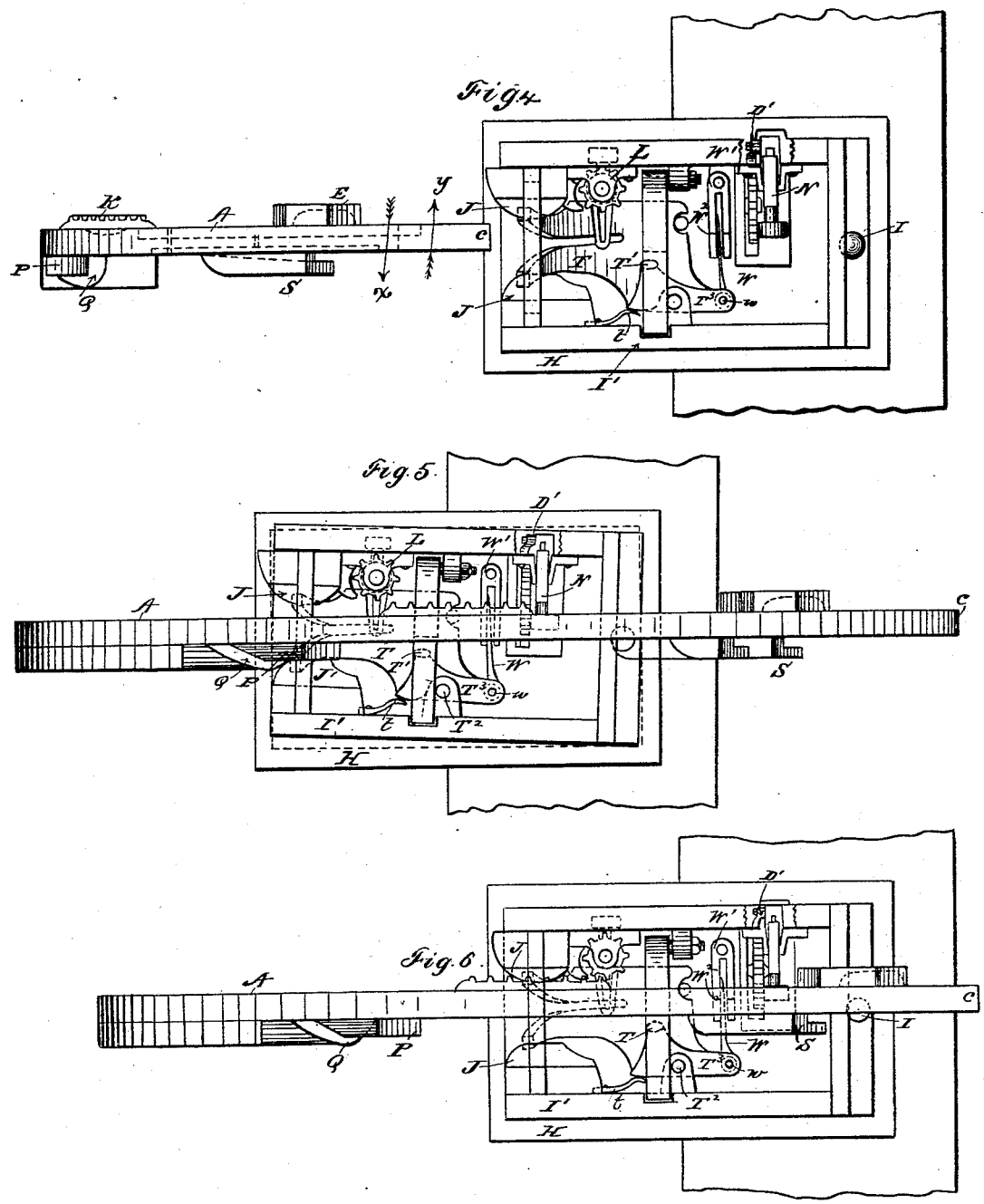
Witnesses.
W. R. Edelen.
E. P. Nichols
Inventor
George Tyler
per
Atty

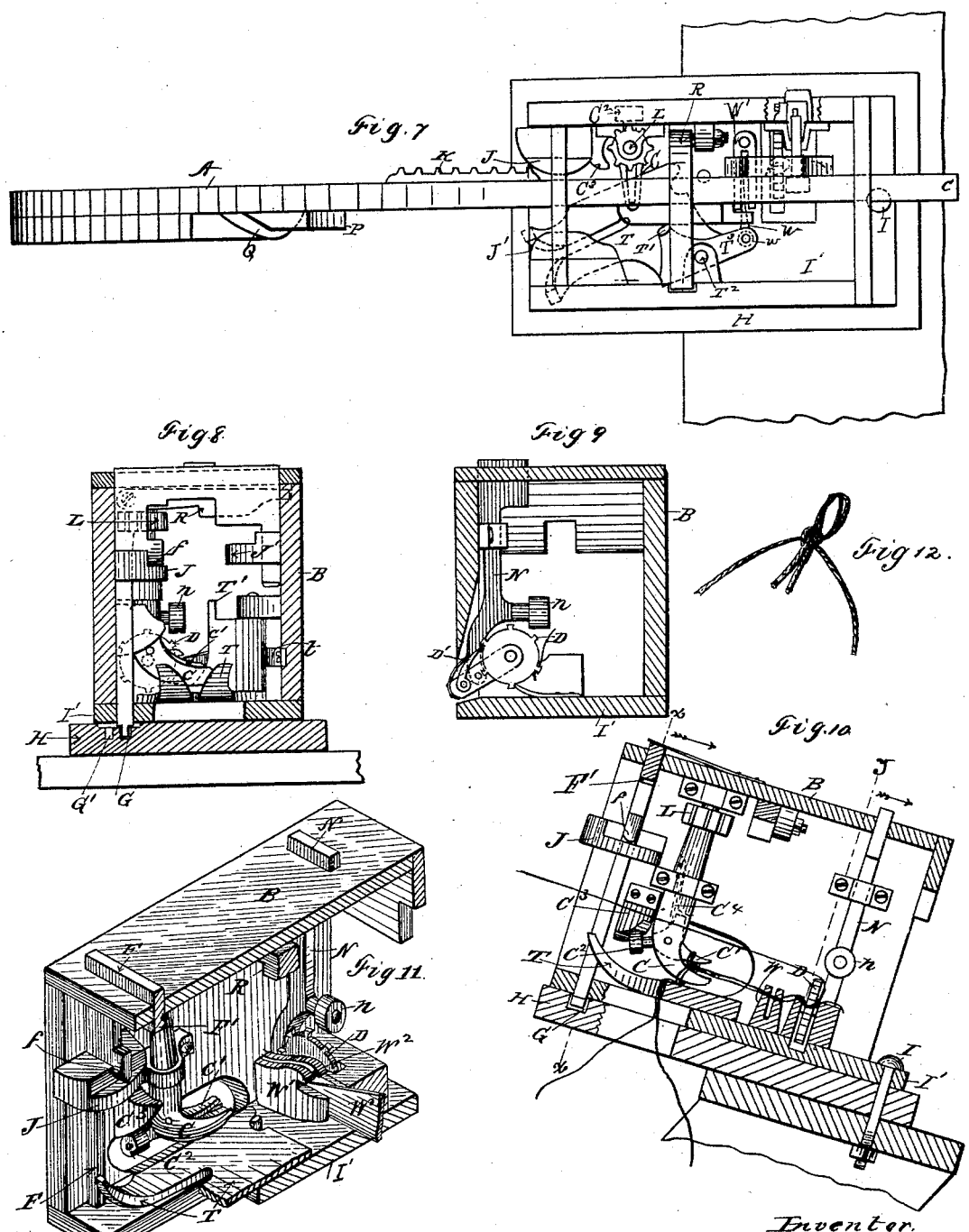

(No Model.) 5 Sheets—Sheet 5.
G. TYLER.
GRAIN BINDER.
No. 315,091. Patented Apr. 7, 1885.
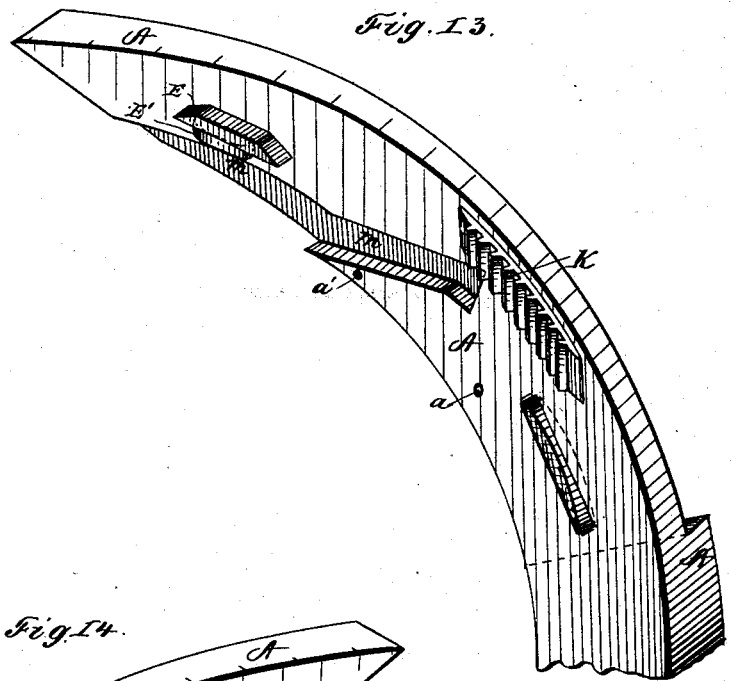
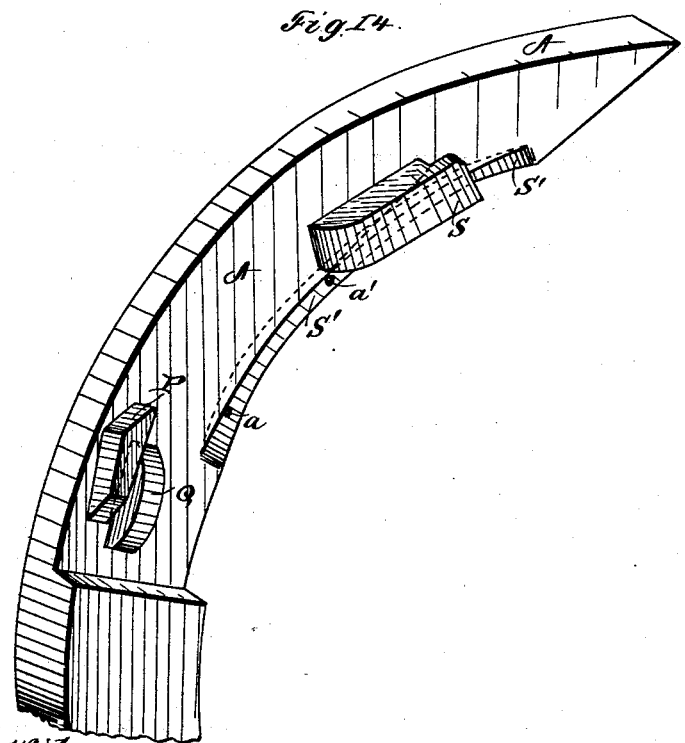
Witnesses
W. R. Edelen
E. P. Nichols
Inventor.
George Tyler
Per [signature]
Att'y

UNITED STATES PATENT OFFICE.

GEORGE TYLER, OF ROCK CREEK, OHIO, ASSIGNOR OF THREE-FOURTHS TO HENRY L. LOBDELL AND AUGUSTUS M. BARKER, BOTH OF SAME PLACE.

GRAIN-BINDER.

SPECIFICATION forming part of Letters Patent No. 315,091, dated April 7, 1885.

Application filed January 7, 1884. (No model.)

*To all whom it may concern:*

Be it known that I, GEORGE TYLER, a citizen of the United States, residing at Rock Creek, in the county of Ashtabula and State of Ohio, have invented certain new and useful Improvements in Grain-Binders; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in grain-binders binding with twine, and especially relates to the construction of a needle and the mechanism of the knotting device operated thereby.

The objects of my invention are, first, to construct upon the needle carrying the binding-twine a toothed rack and a series of cams for operating the knotting mechanism of the machine; second, to construct a knotter which is operated by the needle alone, and having no operative connection with any other part of the mechanism of the machine; third, to make a knotter light and compact and simple in its construction, thereby reducing the weight of machinery and complicated mechanism ordinarily required to operate knotters, and less liable to get out of order than the knotters now in use. I attain these objects by the mechanism illustrated in the accompanying drawings, forming part of this specification, in which—

Figure 1 is a perspective view of a reaping-machine with my improved binding mechanism attached thereto. Fig. 2 is a central longitudinal vertical section of my improved knotter, with a portion of the needle in side elevation, looking in the direction of the arrow *x* in Fig. 4. Fig. 3 is a central longitudinal vertical section of my improved knotter, with a portion of the needle in side elevation, looking in the direction of the arrow *y* in Fig. 4. Fig. 4 is a plan view of the knotter and needle in the direction of the arrow *z* in Fig. 2. Figs. 5, 6, and 7 are plan views of the knotter and needle in different positions—viz., Fig. 5 shows the needle having passed through the knotter to the full extent of its forward movement. Fig. 6 shows the position of the needle after the knot is tied; and Fig. 7 shows it operating the mechanism of the knotter for throwing the knot off of the hook and cutting the twine. Fig. 8 is a transverse vertical section of my improved knotter on the line *x x*, Fig. 10, looking in direction of arrow. Fig. 9 is a transverse vertical section of my improved knotter on the line *y*, Fig. 10, looking in direction of arrow. Fig. 10 is a transverse vertical section of my improved knotter, similar to that shown in Fig. 3, except in this figure the mechanism of the knotting-hook and its finger are shown. Fig. 11 is a perspective view of the principal parts of the knotter mechanism of my improved grain-binder through the center thereof. Fig. 12 is a perspective view of the knot as made by my machine. Fig. 13 is a perspective view of one side of the needle, showing the rack-gear and cams thereon. Fig. 14 is a perspective view of the opposite side of the needle, showing the cams thereon.

Like letters of reference indicate like parts in all the figures.

There is nothing novel in the reaping-machine to which my improvements are applied, as they can readily be utilized in the construction of any make of self-binding reaping-machine, as the needle can be operated in any of the many ways grain-binding needles are now operated, my improvements being in the construction and arrangement of the needle and knotter and the actuating of the knotter by the needle.

In the drawings, A is the needle, and B the knotter-casing. The needle A is of a semicircular shape, and is attached to a shaft having an intermittent vibrating movement, arranged preferably under the grain-carrier of the machine, as illustrated in Fig. 1. It may, however, be arranged in any suitable position on the reaping-machine. The knotter-casing B is attached to the machine, as shown in Fig. 1, above the carrier-table, leaving room enough between it and the table to allow a sheaf of grain to pass under it after being bound, and in such a position in relation to the axis of the needle A that it will in its forward movement pass into it as far as necessary. In case the location of the needle is varied, that of the knotter-casing B would necessarily have to be changed accordingly, so that its location will bear the same relation to the needle A as that shown in Fig. 1. The mechanism inclosed in the knotter-casing B consists of a knotting-bill C, perpendicular lever N, actuating a ratchet-wheel, D, for seizing and retaining the binding-twine, a cutter, W, and a stripper, T, all operated by the needle A, as hereinafter described. The needle A carries the binding-twine, which is passed through the holes $a\,a'$, and carried thence into the knotter-casing B, over the knotting-bill C, to a ratchet-wheel, D, with which the binding-twine engages, and is thereby retained in the knotter-casing B. The needle A is provided with a double cam, E E', and as the needle A moves into the knotter-casing B, when it reaches the cam E E', the part E engages with a projection, $f$, on movable stop F, the foot of which stop F passes through the bottom I' of the knotter-casing B and into an opening, G, in the frame H, upon which the knotter-casing B is supported, and to which it is secured by the bolt I, upon which it swings laterally, as hereinafter described, and raises the stop F out of the hole G in the supporting-frame H, and at the same time the part of the cam E' engages with the bearing J on the inner edge of the entrance to the knotter-casing B and throws the knotter-casing B around upon its bearing I until the foot of the stop F drops into the opening G' in the supporting-frame H. This position of the knotter-casing B is shown in Fig. 5. This movement of the knotter-casing B permits the toothed rack K to pass the pinion L on the upper end of the shaft of the knotting-bill C on its way into the knotter-casing B without engaging therewith, the knotter-casing B remaining in this position until the needle A has traveled nearly to the end of its forward stroke, when it is moved back to its former position, as hereinafter described. In the side of the needle A, and commencing nearly at the middle of the raised cams E E', is formed a cam-groove, $m$. (See Fig. 2.) During the passage of the needle A into the knotter-casing B, this cam-groove $m$ engages with a roller, $n$, on the inside of a perpendicular lever, N, which lever N operates the ratchet-wheel D and causes it to catch and hold the end of the twine used in binding while it is being drawn about the sheaf and the knot is being made and the twine knotted about the sheaf is being cut off, as hereinafter described.

On the opposite side of the needle A, back of the toothed rack K, are placed nearly together two cams, P and Q, which operate as follows: As the needle is about completing its forward stroke, the knotter-casing B being at this time retained in the position shown in Fig. 5 by the foot of the stop F resting in the hole G' in the frame H, the cam P engages with a projection, F', on the stop F, which extends across and to the opposite side of the knotter-casing B, (see Fig. 8,) and raises the foot of the stop F out of the opening G', and at the same time the cam Q engages with a bearing, J', on the inner edge of the entrance to the knotter-casing B, and throws the knotter-casing B around upon its bearing I until the foot of the stop F drops into the opening G in the supporting-frame H, in position shown in Fig. 6. At the same time this movement of the knotter-casing B takes place, the needle A completes its forward stroke and is ready for its backward stroke, the movement of the knotter-casing B last referred to having thrown the toothed rack K on the needle A into gear with the pinion L on the upper end of the shaft of the knotting-bill C, where it is retained in gear by the hook R in the upper part of the knotter-casing, which, by the movement of the knotter-casing B last described, engages with the side of the needle A opposite the toothed rack K, and by the backward movement of the needle A the pinion L and the shaft of the knotting-bill C attached thereto are revolved entirely around, thereby knotting the binding-twine, as hereinafter described.

On and attached to the side of the needle A opposite the toothed rack K, and near the lower edge thereof, is a cam, S, and on the same side of the needle A, and under the cam S, and running backward some distance on the needle A, is a recess, S', cut therein. (See Fig. 3.) The cam S and recess S' are so arranged on the needle A that as it passes into the knotter-casing B on its forward stroke the cam S passes freely by the lug T' on the stripper T, it passing into the recess S'; but in the course of the backward movement of the needle A, after the toothed rack K has revolved the knotting-bill C, thereby forming the knot, the cam S engages with the lug T' on the stripper T and rocks it on the bearing T² about one-third of the way around, as shown in Fig. 7, thereby throwing the knot off of the knotting-bill C, and at the same time moving a cutter, W, attached to the opposite end of the stripper T at $w$, so as to cut off the binding-twine beyond the knot and release the bound sheaf, leaving the end of the binding-twine secured in the ratchet-wheel D, ready to perform its part in binding the next sheaf, the needle meanwhile continuing on its backward stroke until its point $c$ is drawn back out of the way of the cut grain accumulating for the next sheaf. This action of the needle A and the movement of the several parts of the knotter mechanism, as hereinbefore referred to, completes one traverse of the needle forward and back, during which time it actuates all of the knotter mechanism in the order of time and in the manner described in the operation of binding a sheaf of grain, leaving the mechanism and twine in position for binding another sheaf.

The knotter-casing B is constructed in an oblong shape, and, as hereinbefore stated, is attached to the machine relatively to the needle A, so that said needle will in its forward stroke penetrate through it to the end of its stroke and be drawn out again on its backward stroke, each movement forward and back actuating parts of the knotter mechanism, as described. The knotter-casing B is mounted on a base, I', to which it is secured by a bolt or bearing, I, upon which it swings laterally, as required, the base I' being firmly secured to the reaper-frame.

The knotter-casing B is constructed in an oblong shape, and has within it a knotting-bill, C, the shaft of which is placed in an upright position on one side of the knotter-casing B. This knotting-bill C is constructed of the ordinary shape, and has a movable jaw, C', which fits in a groove in the upper surface of the rigid jaw of the knotter C, and passes through and is hinged in a slot in the shank of the knotting-bill C, and it also projects through and back of said shank far enough to support a friction-roller, $C^2$, which, as the knotting-bill C revolves, operates against a cam-shaped projection, $C^3$, on the frame of the knotter, so as to raise the movable jaw C' from the rigid jaw of the knotting-bill C to receive the twine in forming the knot, as shown in Fig. 10. The movable jaw C' is forced back into place after the roller $C^2$ has passed the cam $C^3$ by a spring, $C^4$, which is inserted in the shaft of the knotting-bill C. (Shown in dotted lines in Fig. 10.) The knotting-bill C is actuated by a pinion, L, attached to the upper end of the shaft thereof, which engages with the toothed rack K on the needle A as it moves on its backward stroke, as hereinbefore described.

Immediately under the knotting-bill C is located the stripper T, which is constructed with a forked opening, the ends of the prongs being turned up, so as to receive and retain the twine in said opening while the knot is being tied. This stripper T is mounted on a bearing, $T^2$, attached to the bottom I' of the knotter-casing B near the opposite side of the knotter-casing from the knotting-bill C, and about midway longitudinally of the knotter-casing. This stripper T also has an arm, T', which projects upward at right angles to the plane of rotation of the stripper T, and is arranged to engage with the cam S on the needle A during its backward movement, thereby turning the stripper T around about one-third of a revolution, (see Fig. 7,) where the arm T' disengages itself from the cam S and the stripper T is thrown back in place by a spring, $t$, attached to the side of the knotter-casing B. The opposite end of the stripper T is also prolonged in the shape of an arm, $T^3$, to the end of which, at $w$, is attached a knife, W, which knife W is actuated by the movement of the stripper T. This knife W operates in a slotted piece, W', attached to the bottom I' of the knotter-casing B. This slotted piece W' has a groove, $W^2$, cut across it to receive the binding-twine as it is drawn across the slotted piece W', so that after the knot is tied, as hereinbefore described, the same movement of the stripper which throws the knot off of the knotting-bill C actuates the knife W, thereby severing the twine lying in the groove $W^2$ and releasing the bound sheaf. Attached to the bottom of the knotter-casing B on the same side on which the knotting-bill C is located and behind the twine-cutting mechanism hereinbefore described, I place the bearing of the ratchet-wheel D, which wheel D is provided with teeth, which as it revolves catches the binding-twine drawn across it by the action of the needle A, hereinbefore described. This ratchet-wheel D is actuated by a pawl, D', attached to the lower end of a perpendicular sliding lever, N, which pawl D' operates on the ratchet-wheel D to revolve it. The lever N stands nearly in an upright position on the side of the knotter-casing B behind and adjacent to the wheel D, so as to operate the ratchet-wheel D attached thereto. On the inner side of the lever N, nearly midway between the top and the bottom of the knotter-casing B, the lever N is provided with an arm, which arm carries a friction-roller, $n$, which roller $n$ operates in the sunken cam-groove $m$ on the needle A, for actuating the lever N and the ratchet-wheel D operated thereby, as hereinbefore described.

The frame of the knotter-casing B may be constructed of any shape suitable to receive and support the bearings of the several parts hereinbefore described in their relative positions to each other, substantially as shown and described, and any form of knotter producing that result is suitable to contain the operative mechanism described.

I have herein described and shown a simple form and arrangement of mechanism for utilizing my invention. However, I can dispense with many of the parts shown and described and utilize my invention quite as satisfactorily as I now do by the mechanism shown and described; and I do not limit myself to the particular construction and arrangement of parts herein shown and described, as many different forms of construction and arrangement will readily suggest themselves to mechanics desiring to utilize my invention, and thereby accomplish the same results substantially the same as I do.

I am aware that twine grain-binders have heretofore been constructed which accomplish results similar in all respects to those accomplished by my device; but I am not aware that any grain-binder has been heretofore constructed in which a stationary knotting and twine-cutting and twine-holding mechanism of a binder are operated by the needle alone. In this respect I greatly simplify the mechanism required to operate the binder by dispensing with all of the machinery heretofore used to operate the knotter portion of the binding mechanism, thereby reducing its weight, the expense of its construction, and its liability to get out of repair, while at the same time I attain quite as satisfactory results as have been heretofore accomplished.

The operation of my invention is obvious, and will be readily understood from the foregoing description by those conversant with the construction and operation of grain-binders without further explanation.

Having thus described my invention, what I claim as new, and desire to secure by Letters Patent of the United States, is—

1. In a grain-binding machine, a knot-tying mechanism embodying a knot-tyer, cord cutting and holding mechanisms, and a knot-stripper, all combined with and adapted to be operated by the needle, substantially as described and set forth.

2. In a grain-binding machine, the combination of the needle A, provided with a cam-groove, m, with twine-holding mechanism consisting of the lever N and its friction-roller n, pawl D', and ratchet-wheel D, operated thereby, all operating together substantially as and for the purpose set forth.

3. In a grain-binding machine, the combination of the needle A, provided with a cam, S, with knot-stripping and twine-cutting mechanisms, consisting of the knot-stripper T and the knife W, attached thereto, all operating substantially as and for the purpose set forth.

4. In a grain-binding machine, the combination of the needle A, provided with a double cam, E E', with the vertical stop F and the fixed bearings J, all operating together substantially as and for the purpose set forth.

5. In a grain-binding machine, the combination of the needle A, provided with a double cam, P Q, with the projection F' on the stop F, and the fixed bearing J, all operating together substantially as and for the purpose set forth.

6. In a grain-binding machine, the combination of the needle A, provided with holes a a', for conveying binding-twine, the double cam E E', the cam-groove m, the toothed rack K, the cam S, the elongated recess S', and the double cam P Q, all operating substantially as and for the purpose set forth.

7. In a grain-binding machine, the needle A, provided with the raised cams E E', the slotted cam M, the toothed rack K, the raised cam S, and elongated recess S', and the raised cams P Q, in combination with the knot-tyer C, having the pinion L thereon, the knot-stripper T, the cutter W, the lever N, and twine-holder D, operated thereby, all constructed and operating together substantially as set forth.

In testimony whereof I affix my signature in presence of two witnesses.

GEORGE TYLER.

Witnesses:
A. M. BARKER,
H. C. CROWELL.